(12) United States Patent
York et al.

(10) Patent No.: US 9,448,375 B2
(45) Date of Patent: Sep. 20, 2016

(54) DATA COLLECTOR WITH EXPANDED FUNCTIONALITY

(75) Inventors: Dennis York, Corvallis, OR (US); John Paul Harmon, Albany, OR (US); Craig Jurs, Corvallis, OR (US); Gerald Steiger, Corvallis, OR (US); Timothy James Jondrow, Corvallis, OR (US); Robert Nicol, Corvallis, OR (US)

(73) Assignee: Trimble Navigation Limited, Sunnyvale, CA (US)

( * ) Notice: Subject to any disclaimer, the term of this patent is extended or adjusted under 35 U.S.C. 154(b) by 1912 days.

(21) Appl. No.: 11/879,395

(22) Filed: Jul. 16, 2007

(65) Prior Publication Data
US 2009/0025094 A1 Jan. 22, 2009

(51) Int. Cl.
  *G06F 1/16* (2006.01)
  *G02B 6/44* (2006.01)
  *G06F 3/0354* (2013.01)
  *F21V 8/00* (2006.01)

(52) U.S. Cl.
  CPC .............. *G02B 6/44* (2013.01); *G02B 6/0001* (2013.01); *G02B 6/0096* (2013.01); *G06F 1/1626* (2013.01); *G06F 1/1656* (2013.01); *G06F 3/03545* (2013.01)

(58) Field of Classification Search
  CPC ...................................................... G06F 1/1628
  USPC ..................................................... 361/679.32
  See application file for complete search history.

(56) References Cited

U.S. PATENT DOCUMENTS

| | | | |
|---|---|---|---|
| 5,532,466 A * | 7/1996 | Konno et al. ................. | 235/441 |
| 5,718,562 A * | 2/1998 | Lawless et al. ................. | 417/1 |
| 5,805,416 A * | 9/1998 | Friend et al. ............ | 361/679.32 |
| 6,049,813 A * | 4/2000 | Danielson et al. ........... | 708/100 |
| 6,068,119 A * | 5/2000 | Derr et al. .................. | 206/305 |
| D433,798 S * | 11/2000 | Weinstock ..................... | D3/215 |
| 6,305,908 B1 * | 10/2001 | Hermann et al. ............ | 417/234 |
| 6,421,234 B1 * | 7/2002 | Ricks et al. ............ | 361/679.56 |
| 6,497,368 B1 * | 12/2002 | Friend et al. ............ | 235/472.01 |
| 6,532,152 B1 * | 3/2003 | White et al. .................. | 361/692 |
| 6,536,621 B2 * | 3/2003 | Yokobori ..................... | 220/4.02 |
| 6,789,030 B1 | 9/2004 | Coyle et al. | |
| 6,983,130 B2 * | 1/2006 | Chien et al. ................. | 455/90.3 |
| 7,383,038 B2 * | 6/2008 | Koenck et al. ............... | 455/418 |
| 7,611,271 B2 | 11/2009 | Meis et al. | |
| 7,688,580 B2 * | 3/2010 | Richardson et al. .... | 361/679.56 |
| 7,798,692 B2 | 9/2010 | Krupa et al. | |
| 7,852,601 B1 * | 12/2010 | Little ......................... | 360/99.22 |
| 7,853,254 B2 * | 12/2010 | Koenck et al. ............ | 455/432.1 |
| 7,926,981 B2 | 4/2011 | Hunt et al. | |
| 7,933,122 B2 * | 4/2011 | Richardson et al. .... | 361/679.55 |
| 8,147,460 B2 * | 4/2012 | Etter et al. .................. | 604/181 |
| 8,199,489 B2 * | 6/2012 | Mangaroo et al. ...... | 361/679.55 |
| 2003/0052860 A1 * | 3/2003 | Park et al. .................. | 345/156 |
| 2003/0132917 A1 * | 7/2003 | Yuen ............................ | 345/173 |
| 2004/0089570 A1 * | 5/2004 | Chien et al. ................. | 206/320 |
| 2006/0158896 A1 | 7/2006 | Krupa et al. | |
| 2008/0278964 A1 | 11/2008 | Hunt et al. | |

* cited by examiner

*Primary Examiner* — Anthony Q Edwards
(74) *Attorney, Agent, or Firm* — Kilpatrick Townsend & Stockton LLP

(57) ABSTRACT

Embodiments of the present invention recite a data collector with expanded functionality and a method of enhancing revenue generation using a data collector with expanded functionality. In one embodiment, a central unit of a data collector is configured to receive a replaceable unit such that any one of a variety of replaceable units can be configure to be attached to said central unit.

8 Claims, 14 Drawing Sheets

DATA COLLECTOR WITH EXPANDED FUNCTIONALITY

FIELD OF THE INVENTION

Embodiments of the present invention are related to the field of data collection devices

BACKGROUND OF THE INVENTION

Data collectors are a class of handheld electronic devices which are configured to collect and record data. Some data collectors are also capable of manipulating and organizing collected data upon the data collector itself. Many data collectors are equipped with wireless communication devices, position determining devices, display screens, and communication ports for coupling additional devices such as memory cards, or for communicating with other electronic devices.

Data collectors are often exposed to environmental conditions which can quickly degrade their performance, or render them inoperable. For example, they are often more regularly exposed to dust, water, vibration, water, ultraviolet rays, temperature gradients, and even shock from being dropped than typical consumer electronic devices. As a result, components of the data collector can become damaged, or broken, or the integrity of the case of the data collector can be compromised, thus further exposing the internal electrical components to greater damage and/or contamination.

Additionally, components of data collectors can wear out faster than is the norm for consumer electronic devices simply because they are being operated more often. As an example, a touchscreen of a data collector can be expected to undergo up 2000 touch events a day under normal operating conditions depending upon its application. Many touchscreen manufacturers project approximately 100,000 touch events over the life of a typical touchscreen. As a result, in some instances, normal operation of the touchscreen of a data collector can quickly degrade the touchscreen, or render it inoperable.

SUMMARY OF THE INVENTION

Embodiments of the present invention recite a data collector with expanded functionality and a method of enhancing revenue generation using a data collector with expanded functionality. In one embodiment, a central unit of a data collector is configured to receive a replaceable unit such that any one of a variety of replaceable units can be configure to be attached to said central unit.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

DETAILED DESCRIPTION OF THE PREFERRED EMBODIMENT

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Figure 1:
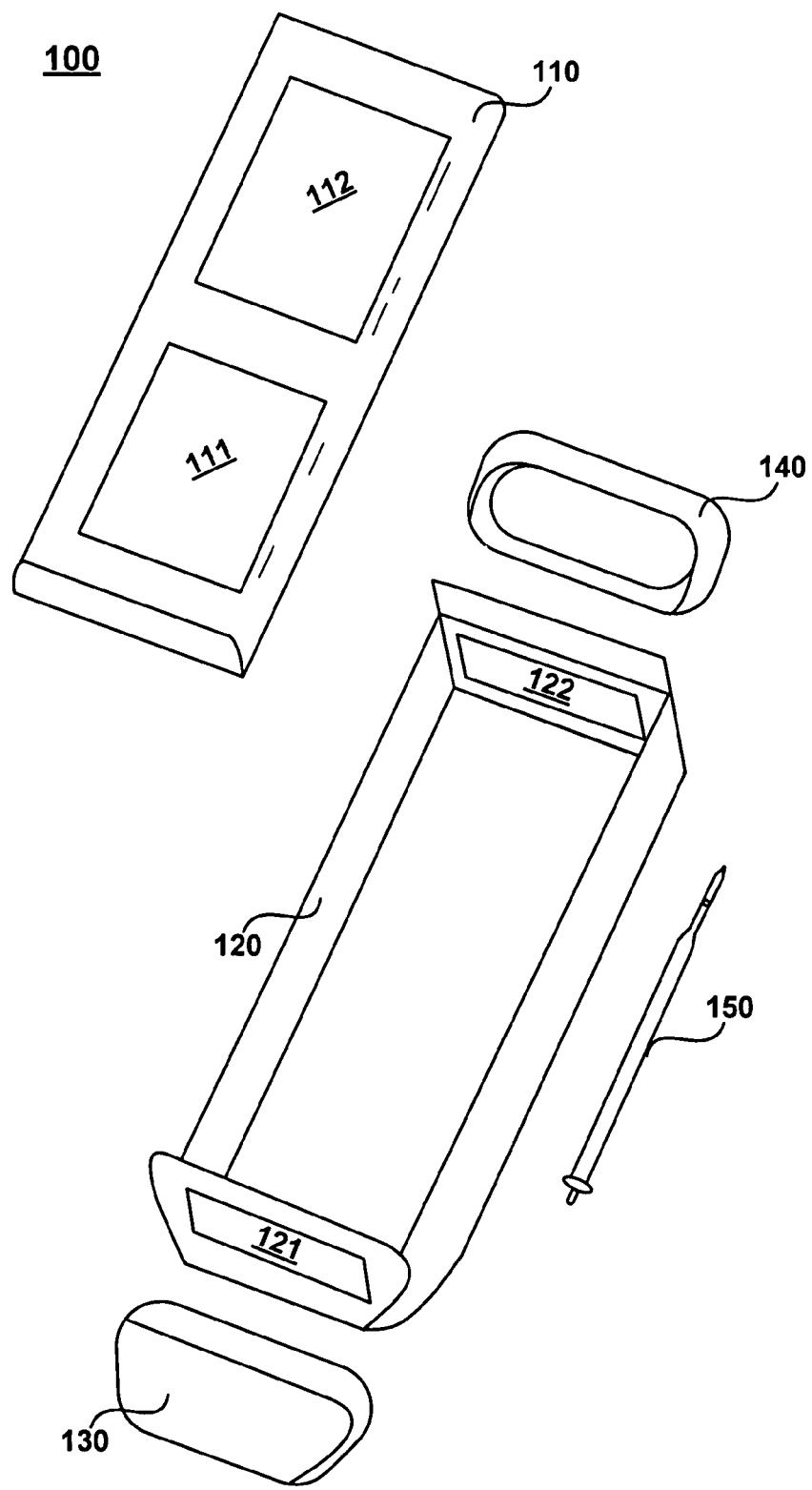
FIG. 1 is a perspective view of a data collector in accordance with an embodiment of the present invention.

FIG. 1 is a perspective view of a data collector 100 in accordance with an embodiment of the present invention. In one embodiment, data collector 100 comprises a GIS data collector. In FIG. 1, data collector 100 comprises a top cover 110, a bottom cover 120, and a bottom and top cover which are referred to hereafter as bottom boot 130 and top boot 140 respectively and a stylus 150. In one embodiment, top cover 110 and bottom cover 120 comprise rigid molded plastic covers for protecting internal components (not shown) of data collector 100 from damage and contamination. As shown in FIG. 1, top cover 110 further comprises a keypad area 111 and an opening 112 for a display device. Additionally, bottom cover 120 comprises a bottom opening 121 and a top opening 122. Typically, top cover 110 is mechanically fastened to bottom cover 120 using screw fasteners (not shown). Additionally, bottom boot 130 and top boot 140 are then mechanically fastened to bottom cover 120 using screw fasteners (not shown). In one embodiment, an integrated seal or gasket is disposed in the perimeter of the area where top cover 110 joins with bottom cover 120. Additionally, respective seals are disposed within a perimeter area of bottom boot 130 and top boot 140 which join with bottom cover 120. In one embodiment, the integrated seals used in data collector 100 comprise side sealing integrated seals which are discussed in greater detail below.

Integrated Seals

Figure 2:
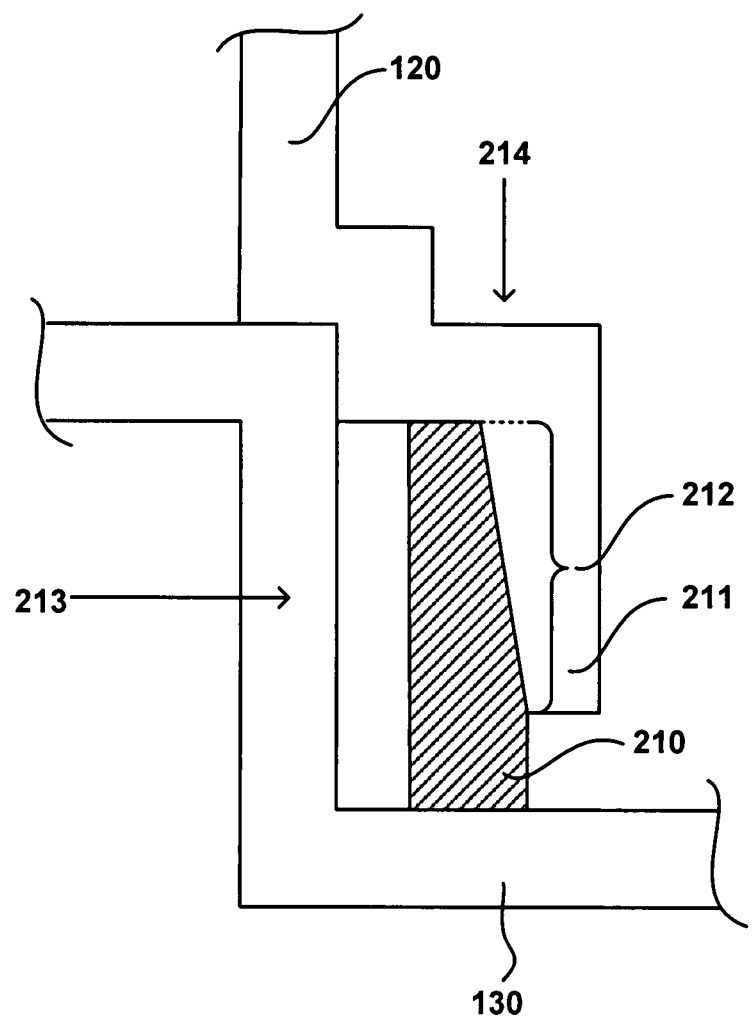
FIG. 2 is a section view of an integrated seal in accordance with embodiments of the present invention.

FIG. 2 is a side section view of an integrated seal in accordance with embodiments of the present invention. In FIG. 2, bottom boot 130 is coupled with bottom cover 120. It is appreciated that other components of data collector 100 may utilize the integrated seals described herein and that bottom boot 130 and bottom cover 120 are specifically discussed for illustration purposes.

In FIG. 2, a rib 211 of bottom cover 120 extends into a portion of bottom boot 130 and contacts an integrated seal 210. In embodiments of the present invention, integrated seal 210 comprises an elastomeric material, such as silicone. As discussed above, bottom cover 120, and thus rib 211, comprises a rigid molded plastic. In one embodiment, bottom boot 130 also comprises a rigid plastic material.

In embodiments of the present invention, integrated seal 210 is created in a liquid injection mold-silicone process which creates a molecular bond between integrated seal 210 and bottom boot 120. Thus, the region in which integrated seal 210 contacts bottom boot 120 is more watertight than conventional compression seals used to protect many handheld electronic devices. In one embodiment, integrated seal 210 is created in a co-molding process using liquid injection molding-silicone when the plastic substrate of bottom boot 130 is created. In another embodiment, integrated seal 210 is created in an overmolding process using liquid injection molding-silicone subsequent to the creating of the plastic substrate of bottom boot 130. In one embodiment, integrated seal 210 comprises a clear, or translucent silicone material.

There are many advantages to using integrated seal 210 as opposed to conventional ring seals typically used. For example, when bottom cover 120 is coupled with bottom boot 130, there is no requirement for applying a clamping force in order to provide a watertight seal to data collector 100. When a conventional compression seal is used, there is a requirement for mechanical force, provided by a mechanical fastener such as a screw, to compress the gasket. In other words, with conventional compression seals, the sealing force is in the same direction as the compression force holding two parts together. In order to provide greater protection against water, the components being joined are therefore screwed together with more force. This creates more stress on the components being joined in the region of the fasteners. As an example, if conventional compression seals are used in handheld electronic device, a greater amount of force would be exerted upon its top cover and bottom cover by the screw holding them together. Thus, if exposed to shock such as, for example, being dropped, there is a greater likelihood of cracks or breaks occurring in the region of the screws.

However, in embodiments of the present invention, integrated seal 210 is placed exterior to the portion of data collector 100 which is being sealed. Thus, when immersed, the force of the water will create a pressure gradient in which greater force is applied from direction 213. In other words, there is negative pressure inside of data collector 100 relative to the force applied from direction 213. Additionally, as data collector 100 is immersed to greater depths, more force is applied in direction 213 which in turn forces integrated seal 210 into rib 211 with greater force. As a result, the sealing force is proportional to the pressure differential between the inside of data collector 100 and the outside. In other words, there is greater sealing force applied as data collector 100 immersed to greater depths. Additionally, there is no need to apply greater clamping force in order to achieve more sealing force. Unlike conventional compression seals, the sealing force of integrated seal 210 is nearly perpendicular to the clamping force (conventionally shown by arrow 214) holding bottom cover 120 and bottom boot 130 together. As a result, little or no clamping force is required to achieve a watertight seal. . . . Thus, when joining components such as bottom cover 120 and bottom boot 130, less stress is placed upon them and there is less likelihood of cracks or breaks forming when data collector 100 is dropped.

Another advantage of integrated seal 210 is that there is a greater sealing area than is exhibited by conventional compression seals. For example, the sealing area between integrated seal 210 and rib 212 is shown in area 212. This is a greater sealing area than would be possible with a conventional compression seal which relies upon compression to achieve a portion of its sealing area. Furthermore, because there is no need to compress integrated seal 210, there is less likelihood of distortion which leads to improved sealing over a longer lifespan of the seal.

Another advantage of integrated seal 210 is that the relatively larger sealing area provides a watertight seal even when small pieces of contamination are in the seal area. For example, during fabrication, small pieces of dust, hair, etc. can come between integrated seal 210 and rib 211 with less likelihood of seal failure due to the relatively greater sealing area compared with conventional compression seals.

Another advantage of integrated seal 210 is greater ease of manufacturing. For example, the molding process places integrated seal 210 more precisely within data collector 100 than processes which use conventional compression seals. For example, when conventional compression seals are being positioned, there is greater likelihood of the gasket moving or being mis-aligned than with using integrated seal 210. Additionally, integrated seal 210 requires fewer final assembly steps than conventional compression seals. Using conventional compression seals, a separate assembly step is necessary for correctly placing the gasket with respect to the components it is sealing.

As discussed above, there is also a molecular bond where integrated seal 210 contacts bottom boot 130 rather than relying upon a pressure seal as with conventional compression seals. Thus, 50% of the sealing area between bottom cover 120 and bottom boot 130 is reduced due to the molecular bond between integrated seal 210 and bottom boot 130. Furthermore, there is less likelihood of damage to integrated seal 210 prior to being disposed within data collector 100. Often, manufacturers find that conventional compression seals become compressed, twisted, or bent prior to final assembly which compromises, or ruins, their use as a watertight seal. However, because integrated seal 210 is not handled separately from, for example, bottom boot 130, it is protected from damage to a greater extent than conventional compression seals.

An additional advantage of integrated seal 210 is the use of molded silicone as a seal material. Conventional methods typically use thermoplastic, or urethane, as a sealing material. These materials have a high compression set meaning that once a clamping force is applied to these materials, they tend to retain the shape they are in when clamped. If the clamping force is relieved (e.g., to replace a component) the gasket is no longer usable because its shape has been distorted. Otherwise, a gap in the seal is likely to develop which will compromise the watertight integrity of the unit. Additionally, these materials are more likely to fail if exposed to wide temperature ranges which are typically found in outdoor environments.

However, embodiments of the present invention utilize silicone in integrated seal 210 which retains its ability to spring back to its original shape if pressure is relieved on the seal and in the presence of wide temperature ranges. Thus, if a user wants to replace a component, there is less likelihood that replacing integrated seal 210 is necessitated as well.

In embodiments of the present invention, integrated seals 210 are intentionally disposed upon inexpensive, or less expensive, components of data collector 100. For example, in one embodiment, rather than molding integrated seal 210 onto bottom cover 120, integrated seal is molded onto bottom boot 130. In so doing, embodiments of the present invention lower the cost of replacing old or worn out integrated seals. As discussed above, integrated seal 210 is molecularly bonded onto a plastic substrate such as bottom boot 130. Thus, if there is a need to replace integrated seal 210, there is a corresponding need to replace the component to which it is bonded. Thus, in embodiments of the present invention, the location at which integrated seal (e.g., 210) is disposed is intentionally selected to be upon the lowest cost component in order to reduce to reduce the cost of replacing an integrated seal.

Integrated Light Pipes

Figure 3A:
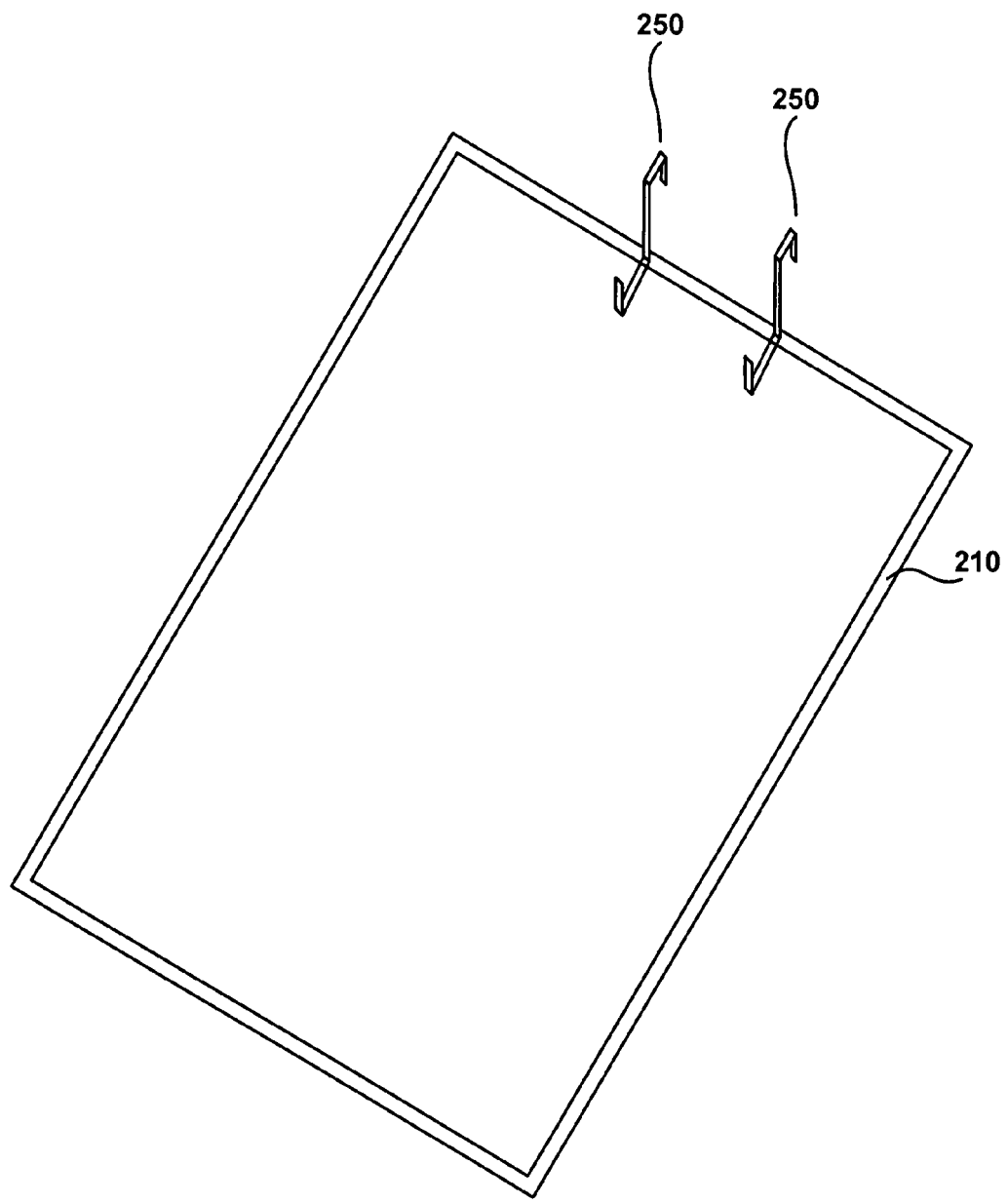
FIG. 3A is a perspective view of an integrated seal and co-molded light pipe in accordance with embodiments of the present invention.

FIG. 3A is a perspective view of an integrated seal 210 and a plurality of co-molded light pipes 250 in accordance with embodiments of the present invention. As shown, in FIG. 3A, light pipe 250 comprises a co-molded structure which is created when integrated seal 210 is created. As an example, during a liquid injection mold-silicone process in which integrated seal 210 is molecularly bonded with a substrate, light pipe 250 can be co-molded in the same liquid injection mold process. Thus, there is no separate step in creating light pipe 250 and integrated seal 210. As a result, the fabrication costs of light pipe 250 is reduced compared with conventional light pipes. As discussed above, creation of integrated seal 210, and thus light pipe 250, may occur in a co-molding process, or in an overmolding process with reference to the substrate material upon which it is disposed. It is noted that embodiments of the present invention are not limited to light pipes alone as co-molded features of integrated seal 210. For example, cushioning structures, assembly guides, speaker enclosures, speaker diaphragms, and the like can be created concurrent with the creation of integrated seal 210 in accordance with embodiments of the present invention.

As discussed above, in embodiments of the present invention, integrated seal 210 comprises a clear silicone material. As a result, embodiments of the present invention are well suited for a "dual-use" application of the material comprising integrated seal 210. Aside from the initial cost of creating a mold which incorporates integrated seal 210 and other features (e.g., light pipe 250), the additional cost per feature is negligible. In contrast, conventional light pipes are created separately from compression seals and other components of a typical handheld electronic device. As a result, the cost per component is higher than that of the present invention. Additionally, the final assembly cost is greater than that of the present invention as each separate component comprises a separate assembly step. Additionally, separate components are more prone to damage prior to final assembly as discussed above. Finally, the co-molded light pipe 250 can be disposed within data collector 100 with greater precision due to the greater precision of the molding machinery used to create integrated seal 210 and light pipe 250.

As discussed above, integrated seal 210, and therefore light pipe 250, comprises a silicone material. The use of silicone is advantageous over conventional light pipe materials which are typically a hard, light conducting. plastic. These components are more prone to scratching, breakage, or mis-alignment during final assembly than the co-molded light pipes of the present invention. Because embodiments of the present invention utilize silicone as a light pipe material, greater durability (e.g., less prone to scratches, breakage, or the like) is exhibited.

Figure 3B:
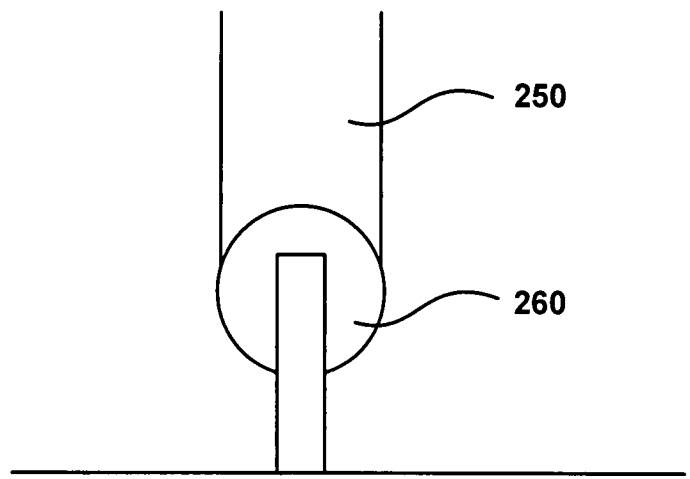
FIG. 3B is a side section view of a co-molded light pipes in accordance with embodiments of the present invention.

An additional advantage of using clear silicone for integrated seal 210 and light pipe 250 is a reduction in the amount of light lost from a light source. FIG. 3B is a side section view of a co-molded light pipe 250 in accordance with embodiments of the present invention. Because light pipe 250 is made from a flexible material such as silicone, it can come into direct contact with a light source such as LED 260 of FIG. 3B and conform to the shape of LED 260. Conventional light pipes made of a hard or rigid material are typically not permitted to directly contact the light source for fear of mechanical damage being conveyed to the light source via the light pipe. However, the silicone material of light pipe 250 is flexible enough that light pipe 250 will compress rather than exert mechanical pressure upon LED 260.

One advantage of directly contacting a light pipe (e.g., 250) with a light source (e.g., LED 260) is that the air gap between light source and light pipe is reduced or eliminated. When light passes from a material with a higher light refraction index than air, some of the light is reflected. As a result, there is an approximate loss of up to 4% of the transmitted light at each interface. In embodiments of the present invention, when light pipe 250 is in contact with LED 260 it conforms at least partially with the shape of LED 260, thus reducing or eliminating the air gap. By facilitating the direct contact of light pipe 250 with LED 260 embodiments of the present invention reduce the amount of light lost at the junction of light pipe 250 and LED 260.

Interchangeability of Bottom Boot

Figure 4A:
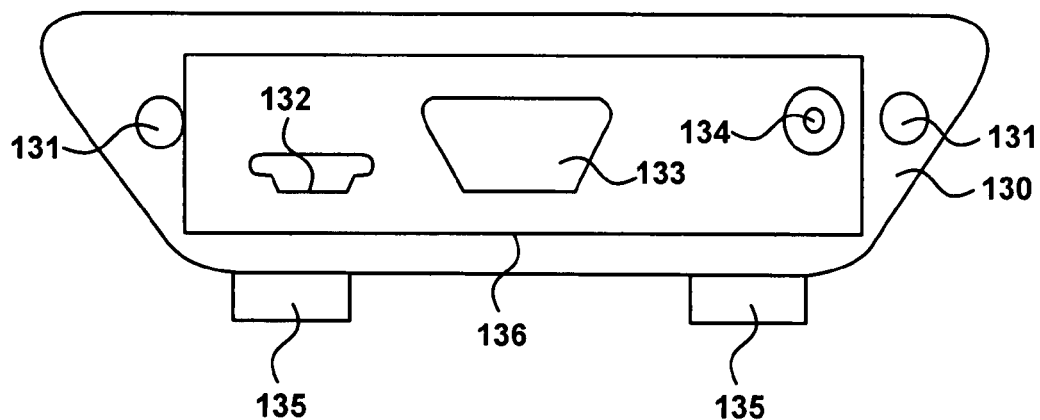
FIG. 4A is a front view of a bottom boot in accordance with embodiments of the present invention.

FIG. 4A is a front view of a bottom boot 130 in accordance with embodiments of the present invention. In FIG. 4A, bottom boot 130 comprises a plurality of screw holes 131 for mechanically coupling bottom boot 130 with bottom cover 120. In one embodiment of the present invention, spring loaded quarter-turn fasteners are used to couple bottom boot 130 with bottom cover 120. This permits rapidly detaching and attaching bottom boot 130 to or from bottom cover 120. Additionally, it permits some movement of bottom boot 130 without transmitting force or shock to bottom cover 120. Additionally, bottom feet 135 provide additional shock protection to data collector 100 when it is disposed in a horizontal position.

Also shown in FIG. 4A are a Firewire connector 132, an RS-232 connector 133, and a power coupling 134 which are disposed within a recessed area 136. It is noted that embodiments of the present invention are not limited to these communication interfaces alone. For example, embodiments of the present invention may use, but are not limited to, Universal Serial Bus (USB) ports, Secure Digital (SD) card ports, PCMCIA slots, headphone jacks, a docking connector, an RJ-45 port, or another magnetic or optical data port as a component of bottom boot 130. In embodiment of the present invention, bottom boot 130 can be configured with additional wired or wireless communication components such as a Bluetooth® communication component, an RFID reader, a magnetic card reader, a television receiver, etc. In embodiments of the present invention, the configuration of which of the above components comprise bottom boot 130 is a production configuration. That is, the individual components (e.g., RS-232 connector 133, power coupling 134, etc.) comprising bottom boot cannot be individually replaced by an end user. Instead, the end user simply determines which bottom boot 130 has the desired components and can install or replace bottom boot 130 themselves as desired. It is noted that the ability of utilize a variety of communication interfaces and/or sensing or communication devices can also be implemented using top boot 140 in accordance with embodiments of the present invention.

Embodiments of the present invention are advantageous by permitting rapid replacement and/or reconfiguration of bottom boot 130. For example, GIS data collectors are often exposed to environmental conditions which quickly degrade or destroy the data connectors. For example, mud, dust, water, ultra-violet exposure, temperature gradients, and the like can quickly render communication interfaces and their connectors inoperable. Because bottom boot 130 can be quickly detached and a new one re-attached by an end user, there is less likelihood of GIS data collector becoming inoperable in the field due to damage, corrosion, or contamination of data connectors. With a typical data collection device, removal or replacement of a communication interface or its data connectors requires a greater extent of disassembly and often cannot be performed by an end user. Thus, there is less down time for data collector 100 and a reduced repair cost in embodiments of the present invention due to the fact that bottom boot can be quickly replaced by the end user in the field. As a result, the effective lifespan of data collector 100 can be extended because of the ease and lower cost associated with replacing damaged components.

An additional advantage of interchangeable bottom boots (e.g., 130) is that the functionality of data collector 100 can be expanded or reconfigured according to changing end user needs. Thus, if a user identifies a new capability that they desire for data collector 100, the end user can simply obtain a different bottom boot 130 which provides the desired capability. Alternatively, a different configuration of bottom boot 130 can provide the ability to communicatively couple and interoperate data collector 100 with new or additional peripheral components or devices, or to provide additional functionality to data collector 100. In embodiments of the present invention, if the desired capabilities are not typically provided in an existing bottom boot (e.g., 130), the end user can order a bottom boot with the desired capabilities built in. Thus, embodiments of the present invention provide new business opportunities to manufacturers of data collector 100 as well as to the end users of data collector 100. For example, a manufacturer can create a bottom boot 130 which is specific to a particular market niche that is not covered by general purpose data collectors. Because this can be performed by creating a bottom boot 130 with the appropriate communication interfaces, the cost of creating a reconfigured data collection device is substantially less than creating a new data collector. Additionally, the reconfiguration of data collector 100 can be easily and quickly implemented once the appropriate bottom boot 130 is created.

Figure 4B:
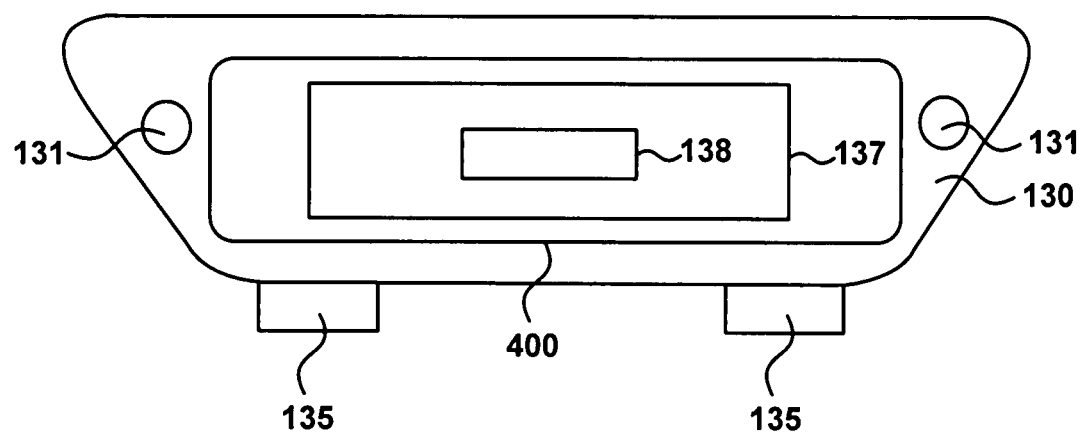
FIG. 4B is a rear view of a bottom boot in accordance with embodiments of the present invention.

FIG. 4B is a rear view of a bottom boot in accordance with embodiments of the present invention. As shown in FIG. 4B, bottom boot 130 further comprise an integrated seal assembly 400 for providing a watertight seal between bottom boot 130 and bottom cover 120 and which is discussed in greater detail below. Bottom boot 130 further comprises an optional printed circuit board 137 and a data connector 138. In embodiments of the present invention, data connector 138 comprises a high pin-count general I/O connector which is communicatively coupled with the main printed circuit board of data collector 100. This provides a standardized data interface between bottom boot 130 and data collector 100. As a result, reconfiguration of data collector 100 can be easily performed by an end user having the appropriate bottom boot 130.

Figure 4C:
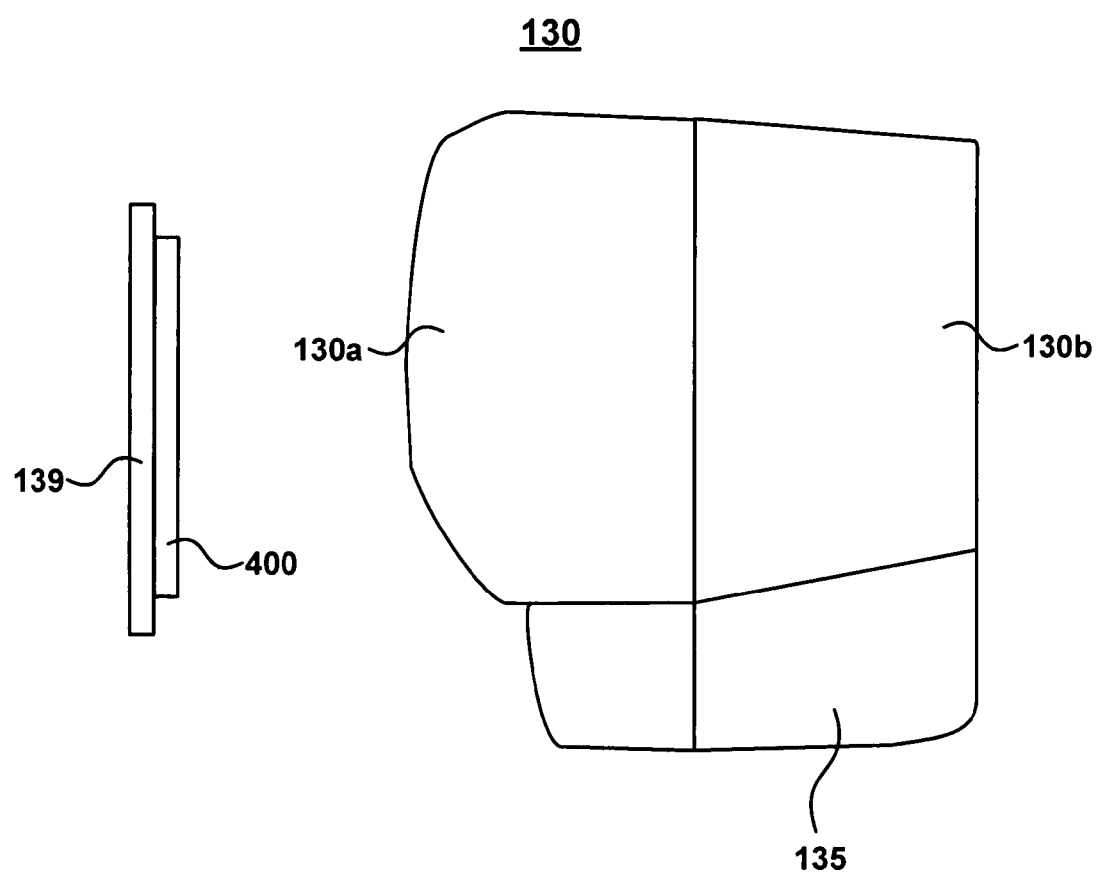
FIG. 4C is a side view of a bottom boot in accordance with embodiments of the present invention.

FIG. 4C is a side view of a bottom boot 120 in accordance with embodiments of the present invention. As shown in FIG. 4C, in one embodiment bottom boot 130 comprises a first section 130a and a second section 130b. In embodiments of the present invention, section 130a comprises a rigid plastic material while section 130b comprises a less rigid plastic material. When bottom boot 130 is coupled with data collector 100, section 130b is disposed proximate to bottom cover 120 while section 130a is disposed to the outside of the unit. Thus, the rigid material of section 130a can absorb the shock of being dropped and transmit the force over the whole area where section 130a joins section 130b. Section 130b then absorbs some of that force before transmitting it to bottom cover 120. As a result, the shock transmitted to bottom cover 120 is reduced when data collector 100 is dropped onto bottom boot 130. Also shown in FIG. 4C is a cover 139 comprising an integrated seal assembly 400. When the data connectors of bottom boot 130 are not in use, cover 139 can be placed over recessed area 136 to provide watertight protection to the components of bottom boot 130.

Figure 4D:
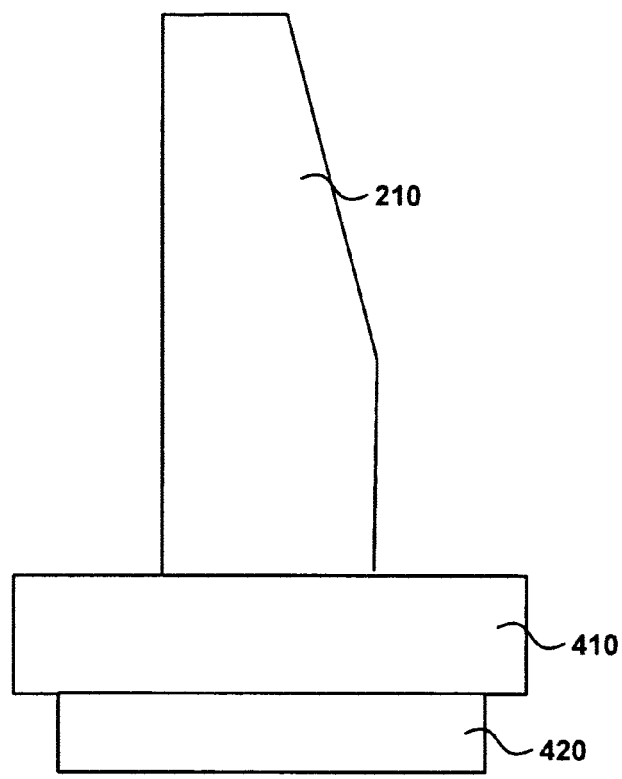
FIG. 4D is a side section view of an integrated seal assembly used in accordance with embodiments of the present invention.

FIG. 4D is a side section view of an integrated seal assembly 400 used in accordance with embodiments of the present invention. In the embodiment of FIG. 4D, integrated seal assembly 400 comprises an integrated seal 210 which is disposed upon a substrate 410. In embodiments of the present invention, substrate 410 comprises a stainless steel plate which is formed in the shape of the opening at the rear of bottom boot 130. Also shown in FIG. 4D is a layer of a hot-melt adhesive 420. When integrated seal assembly 400 is fabricated, integrated seal 210 is over-molded upon substrate 410 using a liquid injection mold-silicone process. In embodiments of the present invention, integrated seal assembly 400 is then placed into the rear of bottom boot 130 so that hot-melt adhesive 420 is proximate to bottom boot 130. The orientation of integrated seal assembly 400 may be facilitated by the use of tabs which correspond to assembly guides (not shown) molded into bottom boot 130. In embodiments of the present invention, the use of a hot-melt adhesive is advantageous in that it is not sticky or tacky at this point which facilitates handling of integrated seal assembly 400 in the fabrication process. Once integrated seal assembly 400 is correctly positioned within bottom boot 130, induction heating of substrate 410 is performed. For example, a current is run through a coil proximate to substrate 410 which induces a current in the stainless steel comprising substrate 410. This causes hot-melt adhesive 420 to melt and bond with bottom boot 130. This method of coupling integrated seal assembly 400 with bottom boot 130 is advantageous in that the heat is localized to integrated seal assembly 400 without heating bottom boot 130. Additionally, the heating and subsequent cooling of substrate 410 occurs quickly, thus minimizing heat induced damage to components of data collector 100.

Stylus

Figure 5A:
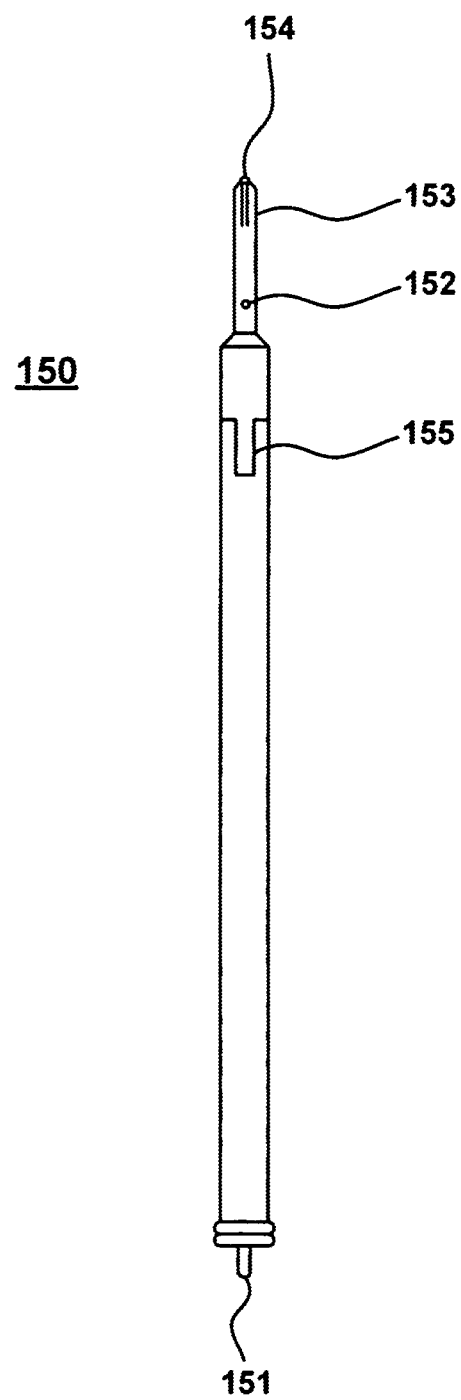
FIG. 5A is a side view of a stylus in accordance with embodiments of the present invention.

FIG. 5A shows a stylus 150 in accordance with embodiments of the present invention. In one embodiment, stylus 150 comprises a spring loaded tip 151, a lanyard hole 152, and a Phillips screwdriver tip 153. Spring loaded tip 151 is for providing user input using a touchscreen display of data collector 100.

In one embodiment, spring loaded tip 151 is made of a plastic material which is less likely to damage the surface of the touchscreen assembly due to scratches, dents, or the like. Because it is spring loaded, the tip can retract into the body of stylus 150 when a user presses stylus 150 onto a surface, thus limiting the amount of force that a user can apply to the surface of the touchscreen assembly before spring loaded tip 151 is fully retracted. This also provides a user with some amount of feedback regarding how much force is being applied to the surface of the touchscreen assembly. For example, the user will know that enough force has been applied to register contact with touchscreen assembly when spring loaded tip 151 is fully retracted into the body of stylus 150. This is especially important for extending the lifespan of touchscreens used in data collectors. For example, in some instances, a data collector touchscreen can register up to 2000 touch events in each day of normal use. This is due in part to the fact that it may be in use for hours at a time. Additionally, the user interface of some data collector applications may provide so many options that a user simply utilizes the touchscreen assembly that much in a normal day. Most touchscreen manufacturers project an average lifespan for a touchscreen assembly at about 100,000 touch events. Thus, in normal operating conditions, the touchscreen of some data collectors can be expected to become significantly degraded, or inoperable within a few months. Thus, in embodiments of the present invention, the use of spring loaded tip 151 facilitates extending the lifespan of the touchscreen assembly used in data collector 100. Additionally, embodiments of the present invention utilize a thicker protective layer over the screen of the touchscreen to extend the lifespan of the touchscreen assembly.

Lanyard hole 152 is for attaching a lanyard to stylus 150. This is a convenience to some users who prefer to wear stylus 150 around their neck when using data collector 100. For example, a user may find it inconvenient to repeatedly place stylus 150 back into its receptacle in data collector 100. By permitting users to wear stylus 150 around their neck, the users will find it more convenient to use stylus 150 and reduce the likelihood of misplacing or losing stylus 150.

Phillips screwdriver tip 153 is for facilitating the replacement of components of data collector 100 by a user. As discussed above, a user can replace components of data collector 100 such as bottom boot 130 on their own. This may be to replace a damaged bottom boot, or to reconfigure data collector 100 for another use. In embodiments of the present invention, the size of Phillips screwdriver tip 153 is selected to be operable only with components of data collector 100 which are to be user replaceable. For example, while Phillips screwdriver tip 153 fits properly with fasteners of bottom boot 130, it does not fit properly with fasteners of top boot 140. Thus, the user is prevented from using stylus 150 to replace, or remove, components of data collector 100 which are not considered user replaceable. It is noted that in other embodiments of the present invention, a different type of fastener may be used to couple either bottom boot 130, or top boot 140 with data collector 100. Thus, in other embodiments of the present invention, a different type of tip (e.g., a flat screwdriver, hex wrench, Torx wrench, etc) may be used in place of Phillips screwdriver tip 153.

In one embodiment, Phillips screwdriver tip 153 further comprises a stylus tip 154. In embodiments of the present invention, stylus tip 154 comprises a plastic material similar to that used in spring loaded tip 151. This is to prevent damage if a user inadvertently uses Phillips screwdriver tip 153 to input data into a touchscreen assembly of data collector 100. In one embodiment, stylus tip 154 is also spring loaded as discussed above with reference to spring loaded tip 151.

In one embodiment, stylus 150 further comprises a hinge 155. Hinge 155 allows a user to rotate a portion of stylus 150 at an angle (e.g., 90 degrees) from Phillips screwdriver tip 153 such that stylus 150 is configured more as a wrench or Allen wrench. As a result, a user can apply more torque to a fastener than is possible when using stylus 150 as a screwdriver.

Figure 5B:
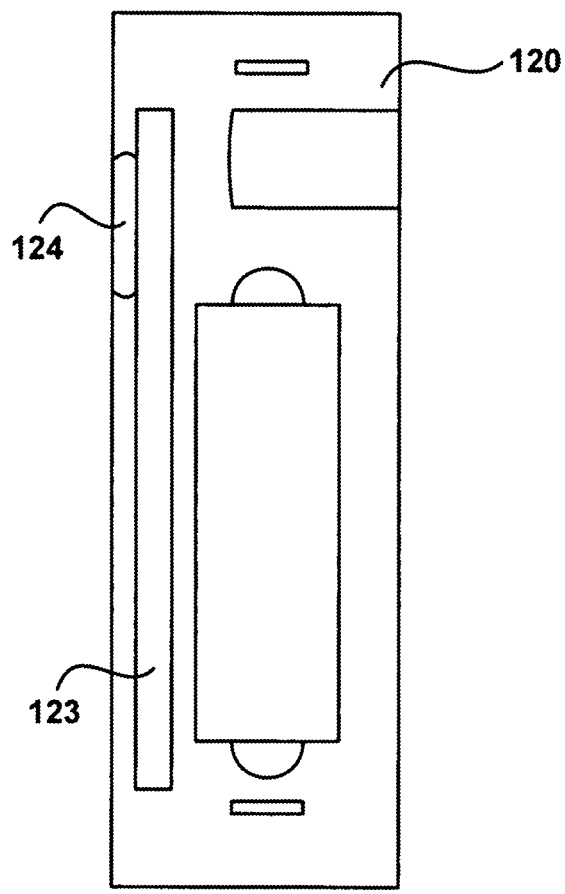
FIG. 5B shows a receptacle for a stylus in accordance with embodiments of the present invention.

FIG. 5B shows a receptacle 123 for stylus 150 in accordance with embodiments of the present invention. As shown in FIG. 5B, receptacle 123 is disposed on the back side of bottom cover 120. In embodiments of the present invention, a magnet, or magnets, (not shown) are disposed inside of bottom cover 120. When stylus 150 is not in use, a user can conveniently place stylus 150 in receptacle 123 where it will be held in place by the magnets. As shown in FIG. 5B, a scalloped edge 124 is adjacent to receptacle 123 to facilitate the user accessing stylus 150.

Keypad

In embodiments of the present invention, top cover 110 comprises a molded silicone cover. This provides excellent flexibility over a wider range of temperatures that conventional data collector device. In embodiments of the present invention, top cover 110 is a replaceable unit which permits reconfiguring data collector 100 as desired by an end user. It is noted that the replacement of top cover 110 is not intended as a user performed task in an embodiment of the present invention. In one embodiment, keypad area 111 of top cover 110 is configured as an alpha-numeric keypad with a QWERTY keyboard. In another embodiment, keypad area may be configured to specifically interact with a software program operating on data collector 100. Thus, keypad area may comprise buttons for invoking specific functions as well as a simplified navigation device or cursor control. In another embodiment, keypad area 111 comprises a cellular telephone keypad. In one embodiment, this is in addition to the standard QWERTY keypad discussed above. In embodiments of the present invention, the relative sizes of keypad area 111 and/or opening 112 for a display device may changed depending upon a desired configuration of an end user. It is noted that the configuration and functionality of keypad area 111 and/or the display device of data collector 100 can be custom configured according to the needs of a particular end user. Thus, not only can the functionality of data collector 100 be modified by replacing bottom boot 130, but the display qualities and data input capabilities can be modified as well. Additionally, the incorporation of a waterproof cellular telephone into data collector 100 provides additional capabilities.

Figure 6A:
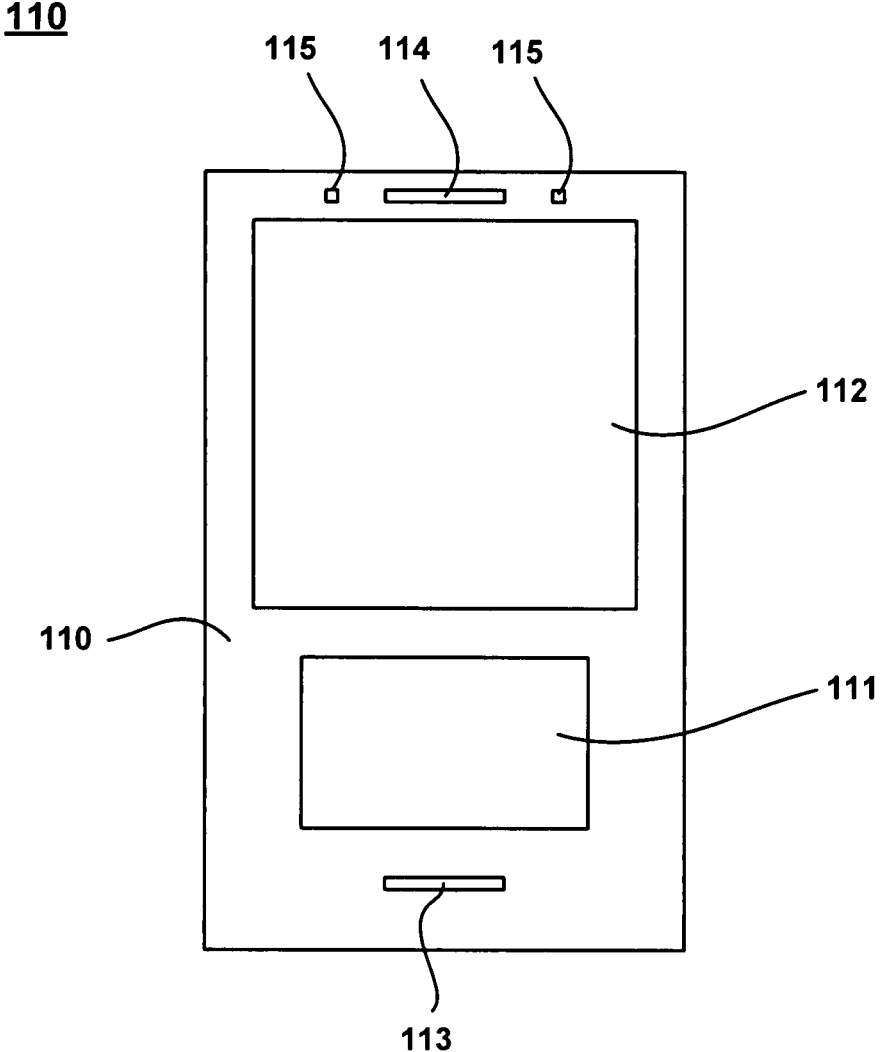
FIG. 6A shows a top cover in accordance with embodiments of the present invention.

FIG. 6A shows a top cover 110 in accordance with embodiments of the present invention. In FIG. 6A, top cover 110 comprises a keypad area 111 and an opening 112 for a display as discussed above. Top cover 110 further comprises an opening 113 for a sealed voice receiver and a second opening 114 for a handset speaker of a cellular telephone. Also shown in FIG. 6A are a plurality of openings 115 for integrated light pipes (e.g., 250) as discussed above. In embodiments of the present invention, openings 113 and/or 114 may comprise a grille over the opening which prevents damage to an underlying watertight seal. In one embodiment, the seal underlying openings 113 and/or 114 may comprise an over-molded portion of integrated seal 210 as described above. In embodiments of the present invention, the grille can withstand enough pressure to permit a user to hose off data collector 100 without damaging the grilles. This facilitates cleaning contamination which may enter the grilles but is stopped by the underlying watertight seal.

Figure 6B:
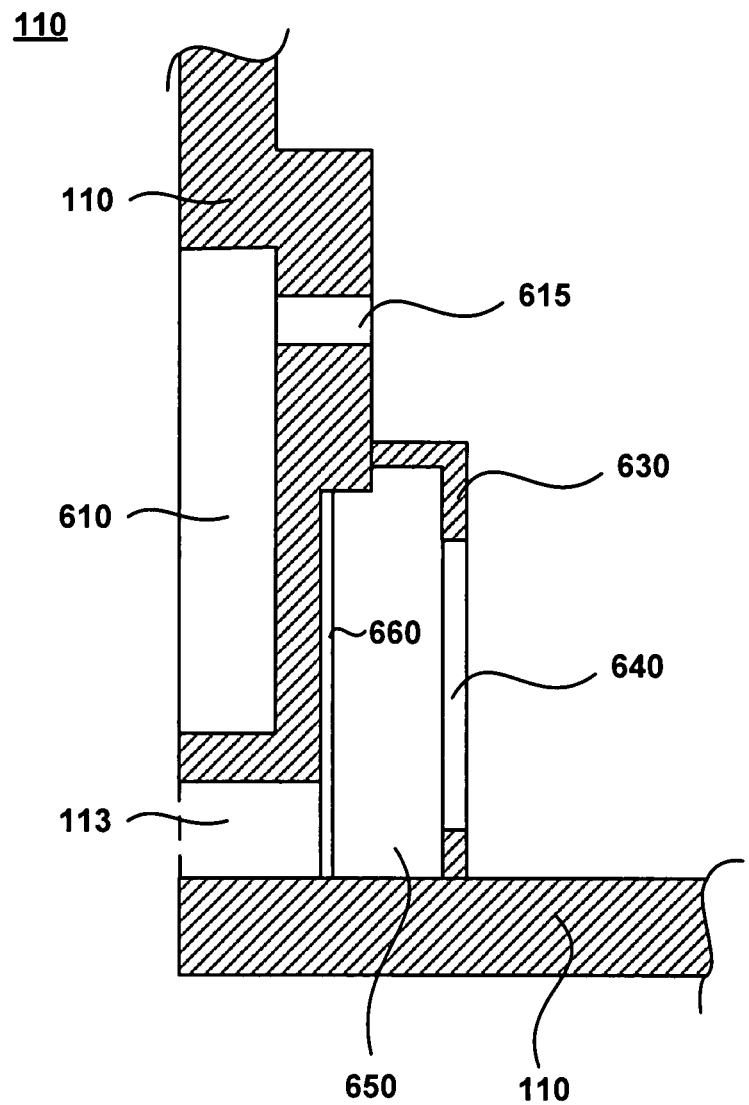
FIG. 6B is a side section view of a top cover in accordance with embodiments of the present invention.

FIG. 6B shows a side section view of a top cover 110 in accordance with embodiments of the present invention. In FIG. 6B, top cover 110 comprises opening 113 as discussed which is configured to receive voice commands. Top cover 110 further comprises a keypad component 610 disposed within top cover 110. In embodiments of the present invention, keypad component 610 further comprises a printed circuit board comprising a keypad controller which is communicatively coupled with the main printed circuit board of data collector 100 via a universal interface 615. In embodiments of the present invention, all implementations of keypad 610 are communicatively coupled with the main circuit board of data collector 100 via universal interface 615. In embodiments of the present invention, circuitry (e.g., a cellular telephone transceiver) for implementing a cellular telephone in data collector 100. In another embodiment, the cellular telephone transceiver may be located in a different portion of data collector 100. In one embodiment, keypad 610 can be coupled with top cover 110 using a pressure sensitive adhesive such as a silicone adhesive. In another embodiment, the copper traces around the periphery of keypad 610 may be used to couple keypad 610 with top cover 110 in an induction heating process as described above with reference to FIG. 4D. That is, a hot-melt adhesive (not shown) is disposed upon copper circuitry of keypad 610 and heated by inductive heating to bond with top cover 110.

In FIG. 6B, top cover 110 further comprises a microphone 640 disposed within a cover 630. In embodiments of the present invention, cover 630 is ultrasonically welded to top cover 110 to form a resonance chamber 650. Resonance chamber 650 improves the volume performance of microphone 640 when it is used as a speaker in embodiments of the present invention. Additional improvement of the volume performance of microphone 640 is realized because microphone 640 is mounted in a forward facing (e.g., toward opening 113). In one embodiment, microphone 640 is coupled with cover 630 using a pressure sensitive adhesive to maintain a watertight seal and to seal the speaker diaphragm to cover 630. In one embodiment, a thin silicone membrane 660 covers opening 113 and provides additional watertight protection to microphone 640 and forming a sealed voice receiver for data collector 100.

Figure 7:
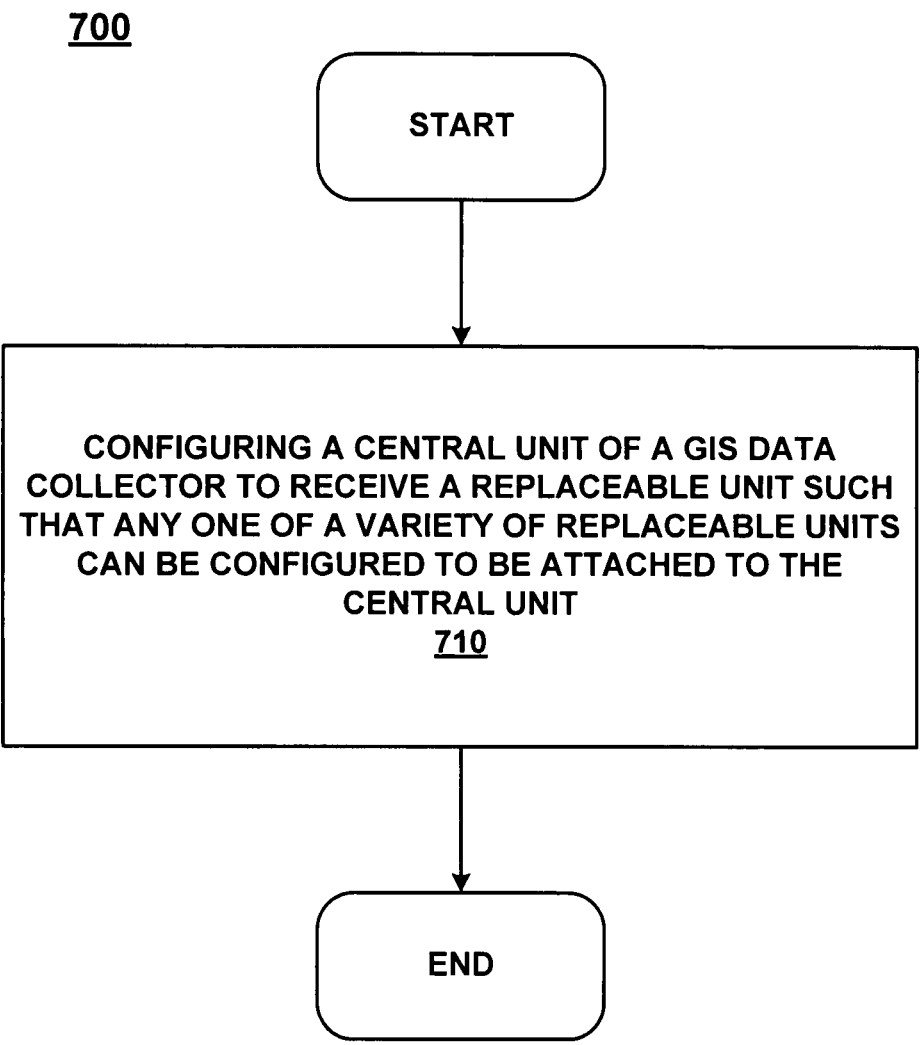
FIG. 7 is a flowchart of a method for enhancing revenue generation using a data collector with expanded functionality in accordance with embodiments of the present invention.

FIG. 7 is a flowchart of a method 700 for enhancing revenue generation using a data collector with expanded functionality in accordance with embodiments of the present invention. In block 710 of FIG. 7, a central unit of a data collector is configured to receive a replaceable unit such that any one of a variety of replaceable units can be configured to be attached the central unit. As discussed above, bottom cover 120 comprises a central unit of data collector 100 and houses the main printed circuit board and other components. In embodiments of the present invention, bottom boot 130 and top boot 140 are removable and replaceable units which can be coupled with bottom cover 120. In embodiments of the present invention, bottom boot 130 and top boot 140 can be configured with a variety of communication interfaces, communication devices, sensors, and other couplings in order to customize the configuration of data collector 100 and/or to provide additional functionality to the unit. Thus, embodiments of the present invention provide enhanced revenue generation by facilitating the modification of data collector 100 to meet emerging market opportunities. In embodiments of the present invention, bottom boot 130 comprises a user replaceable unit which permits a user to modify, or repair data collector 100 in the field without the need for specialized training or equipment. The ability of quickly reconfigure or repair data collector 100 is especially beneficial to smaller enterprises which may not have the resources to purchase a separate data collector for each particular task they are performing. Thus, embodiments of the present invention also provide enhanced revenue generation by providing a range of replaceable units which can reduce the operating costs of enterprises using data collector 100.

Figure 8:
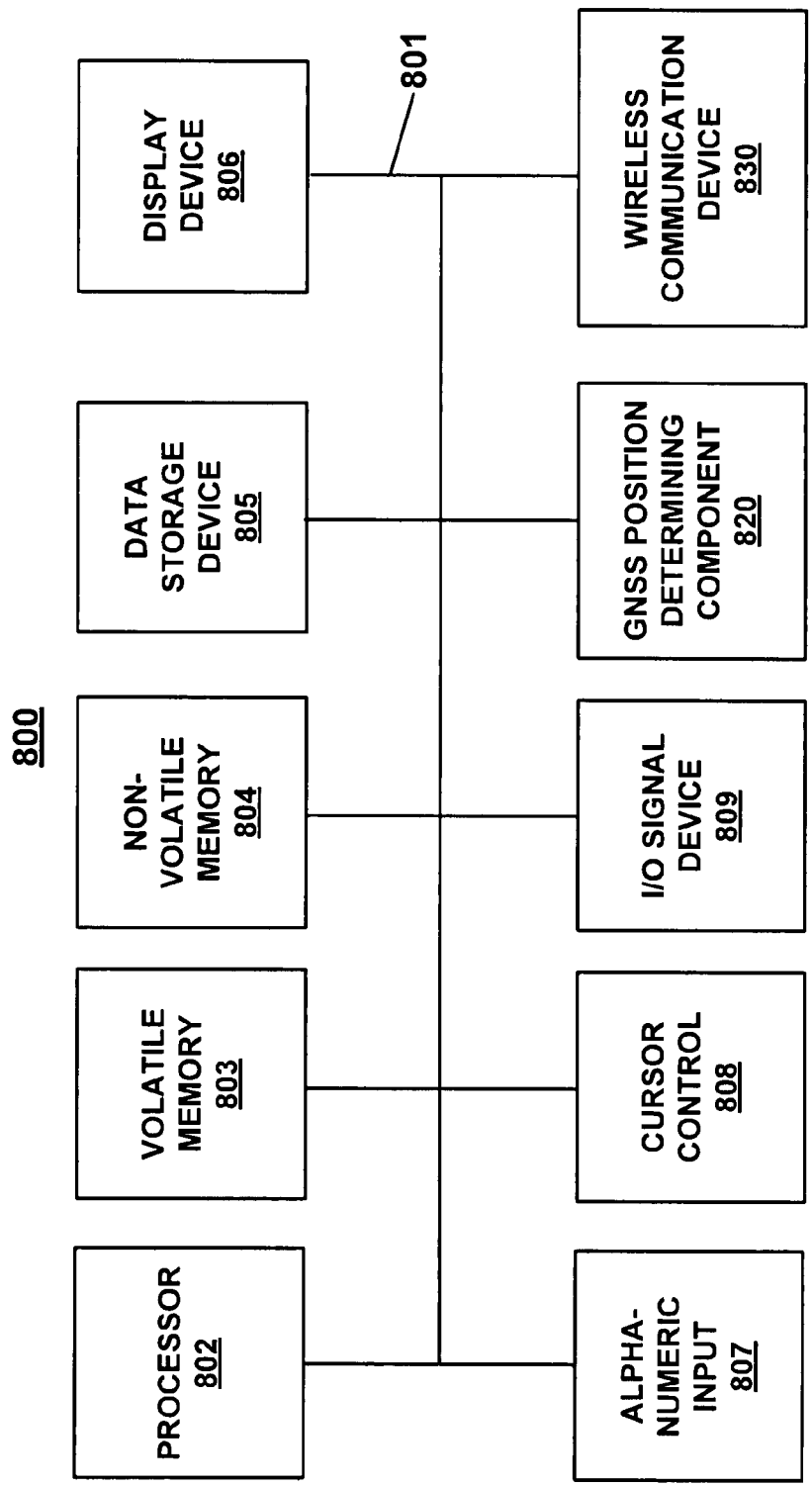
FIG. 8 is a block diagram of a data collector in accordance with embodiments of the present invention.

FIG. 8 is a block diagram of a data collector 100 in accordance with embodiments of the present invention. In one embodiment, data collector 100 comprises an address/data bus 801 for conveying digital information between the various components, a central processor unit (CPU) 802 for processing the digital information and instructions, a volatile main memory 803 is comprised of volatile random access memory (RAM) for storing the digital information and instructions, and a non-volatile read only memory (ROM) 804 for storing information and instructions of a more permanent nature. In addition, data collector 100 may also include a data storage device 805 (e.g., a magnetic, optical, floppy, or tape drive or the like) for storing vast amounts of data. In one embodiment of the present invention, data storage device 805 may comprises a removable data storage device.

Additional devices comprising data collector 100 include a display device 806 for displaying information to a user, an optional alpha-numeric input device 807 (e.g., a keyboard 610 of top cover 110), and an optional cursor control device 808 (e.g., mouse, trackball, light pen, etc.) for inputting data, updates, etc. Data collector 100 can also include a mechanism for emitting an audible signal (not shown).

Returning still to FIG. 8, display device 806 of FIG. 8 may be a liquid crystal device, field emission device (FED) organic light emitting diode (OLED), or other display device suitable for crating graphic images and alphanumeric character recognizable to a user. In one embodiment, display device 806 is a flat panel multi-mode display capable of both monochrome and color display modes. In embodiments of the present invention, display device 806 comprises a touch-screen assembly operable for detecting an input from a user and determining the coordinates Cursor control device 808 allows the computer user to dynamically signal the two dimensional movement of a visible symbol (cursor) on a display screen of display device 806. It is be appreciated that a cursor can be directed and/or activated via input from alpha-numeric input 807 using special keys and key sequence commands. In one embodiment of the present invention, display device 806 further comprises a touch-screen assembly such as a flat panel resistive touch screen assembly. The touch screen assembly can communicate information (spatial data) and command selections to the processor 802 and is further capable of registering a position on the display device 806 where contact is made between resistive a digitizer film and a digitizing element of the touchscreen assembly. Accordingly, in embodiments of the present invention, data collector 100 does not utilize alphanumeric input device 807 or cursor control device 808 for user input due to the use of the touchscreen assembly.

Furthermore, data collector 100 can include an input/output (I/O) signal device (e.g., interface) 809 for interfacing with a user replaceable peripheral device (e.g., bottom boot 130 of FIG. 1).

In one embodiment, data collector 100 comprises a GIS data collector. As shown in FIG. 8, position determining component 820 is for determining the location of data collector 100. In embodiments of the present invention, GNSS position determining component 820 comprises a GNSS antenna and a GNSS receiver. However, while the present embodiment specifically recites a GNSS position determining component, embodiments of the present invention are well suited to utilize a variety of terrestrial-based and satellite-based position determining components as well. In embodiments of the present invention, the geographic position determined by position determining component 820 describes the latitude and longitude of data collector 100. However, position determining component 820 may also determine the elevation of electronic device in embodiments of the present invention.

An optional wireless communications component 830, comprising a wireless modem and a wireless antenna, is also coupled with bus 801. Wireless communications component 830 is for transmitting and receiving wireless messages (e.g., data and/or commands). In embodiments of the present invention, wireless communication component 830 is compliant with the Global System for Mobile Communications (GSM) specification. While the present invention recites a GSM compliant wireless communication device, other wireless communication specifications, such as the Global Packet Radio Service (GPRS) specification, may be utilized in embodiments of the present invention. In one embodiment, data collector 100 sends and receives messages using the Short Message Service (SMS). However, the present invention is well suited to utilize other message formats as well.

In other embodiments of the present invention, wireless communications component 830 may comprise a Bluetooth wireless communications device, or another wireless communications device such as a Wi-Fi transceiver. Wi-Fi transceivers are often used to create local area networks between a computer and an Internet access point in public areas such as airports, coffee shops, libraries, and the like. Alternatively, many cellular telephone providers also provide wireless Internet services using communication devices known as "air cards" which refer to wireless communication devices which allow electronic devices to pick up wireless radio signals in a manner similar to a cellular telephone. One type of air card couples with a PCMCIA Type 2 card slot disposed within, for example bottom boot 130, and facilitates establishing a wireless Internet connection when installed. Thus, in one embodiment, wireless communication device 830 comprises an air card.

The preferred embodiment of the present invention, a data collector with expanded functionality, is thus described. While the present invention has been described in particular embodiments, it should be appreciated that the present invention should not be construed as limited by such embodiments, but rather construed according to the following claims.

What is claimed is:

1. A ruggedized data collector comprising:
   at least one integrated seal for creating a watertight seal between a first component of said ruggedized data collector and a second component of said ruggedized data collector and wherein a sealing force of said at least one integrated seal is not parallel with a mechanical force coupling said first component and said second component; and
   a stylus comprising:
      a spring loaded data input tip;
      a tool for actuating a mechanical fastener of said ruggedized data collector, wherein said tool further comprises a second data input tip; and
      a hole for a lanyard,
   wherein said stylus is configured to be magnetically coupled with said ruggedized data collector when not in use.

2. The ruggedized data collector as recited in claim 1 wherein said second data input tip further comprises a second spring loaded data input tip.

3. The ruggedized data collector as recited in claim 2 wherein said stylus further comprises a hinge for permitting greater torque to be applied using said tool.

4. A ruggedized data collector comprising:
   an interchangeable cover for reconfiguring said ruggedized data collector to function as a cellular telephone;
   a watertight seal for forming a sealed voice receiver within said interchangeable cover;
   at least one integrated seal for creating a watertight seal between a first component of said ruggedized data collector and a second component of said ruggedized data collector and wherein a sealing force of said at least one integrated seal is not parallel with a mechanical force coupling said first component and said second component;
   a watertight seal covering every opening of said ruggedized data collector;
   at least one user replaceable unit comprising a first communication interface; and
   at least one light pipe which is formed concurrent with the creation of said at least one integrated seal and which directly contacts a light emitting diode of said ruggedized data collector.

5. The ruggedized data collector of claim 4 further comprising a stylus.

6. The ruggedized data collector of claim 5 wherein the stylus further comprises a spring loaded data input tip.

7. The ruggedized data collector of claim 5 wherein the stylus further comprises a tool for actuating a mechanical fastener of said ruggedized data collector.

8. The ruggedized data collector of claim 5 wherein the stylus further comprises a hole for a lanyard.

* * * * *